United States Patent
Nilsson

[15] 3,693,321
[45] Sept. 26, 1972

[54] MACHINES FOR PACKING SHEET GLASS WITH INTERLEAVING MEANS

[72] Inventor: Leif Billy Nilsson, Emmaboda, Sweden

[73] Assignee: AB Emmaboda Glasverk, Emmaboda, Sweden

[22] Filed: June 21, 1971

[21] Appl. No.: 154,842

[30] Foreign Application Priority Data

June 22, 1970 Sweden ..................8551/70

[52] U.S. Cl.....................53/244, 53/157, 214/6 M, 214/8.5 D
[51] Int. Cl............................B65b 5/10, B65b 11/00
[58] Field of Search........53/154, 157, 168, 196, 199, 53/237, 244; 214/1 BT, 6 FS, 6 M, 7, 8.5 D; 271/5, 74 R, 74 MS

[56] References Cited

UNITED STATES PATENTS

| | | |
|---|---|---|
| 2,667,420 | 1/1954 | Meulemans et al.....214/8.5 D |
| 3,431,698 | 3/1969 | Bathellier................53/157 X |
| 3,513,625 | 5/1970 | Eller et al. .............53/157 X |

Primary Examiner—Robert L. Spruill
Attorney—Beveridge & De Grandi

[57] ABSTRACT

A machine for packing glass sheets interleaved with paper and having two carriages provided with movable suction heads and movable along parallel paths simultaneously in mutually opposite directions for alternately picking up the glass sheets one by one at a pick-up station and stacking them at a delivery station, and a holder with a paper roll secured to one of the carriages in position to be carried past the delivery station on each station-to-station movement thereof, thereby rolling out paper over the glass sheet last delivered.

3 Claims, 4 Drawing Figures

MACHINES FOR PACKING SHEET GLASS WITH INTERLEAVING MEANS

The invention is used mainly in connection with the manufacture of window glass, the glass sheets after cutting and sorting according to size being collected in packs or stacks where the sheets are in direct engagement with one another, and then are to be repacked, for instance in wooden crates, for transport or storage, where they are not allowed to be in direct contact with one another since this would bring the risk of surface damage. They are therefore packed with interleaving paper, and the invention has for its object to provide mechanical operating means to facilitate this operation, thereby to reduce the costs in connection therewith.

The sheet glass industry often employs handling machines with suction cups capable of adhering to and lifting and carrying a glass sheet, and the invention provides a machine of this type which is so constructed and equipped that it can quickly and efficiently perform the repacking operation.

The invention will now be described in more detail, reference being had to the accompanying, simplified and partly diagrammatic drawings in which.

Figure 1:
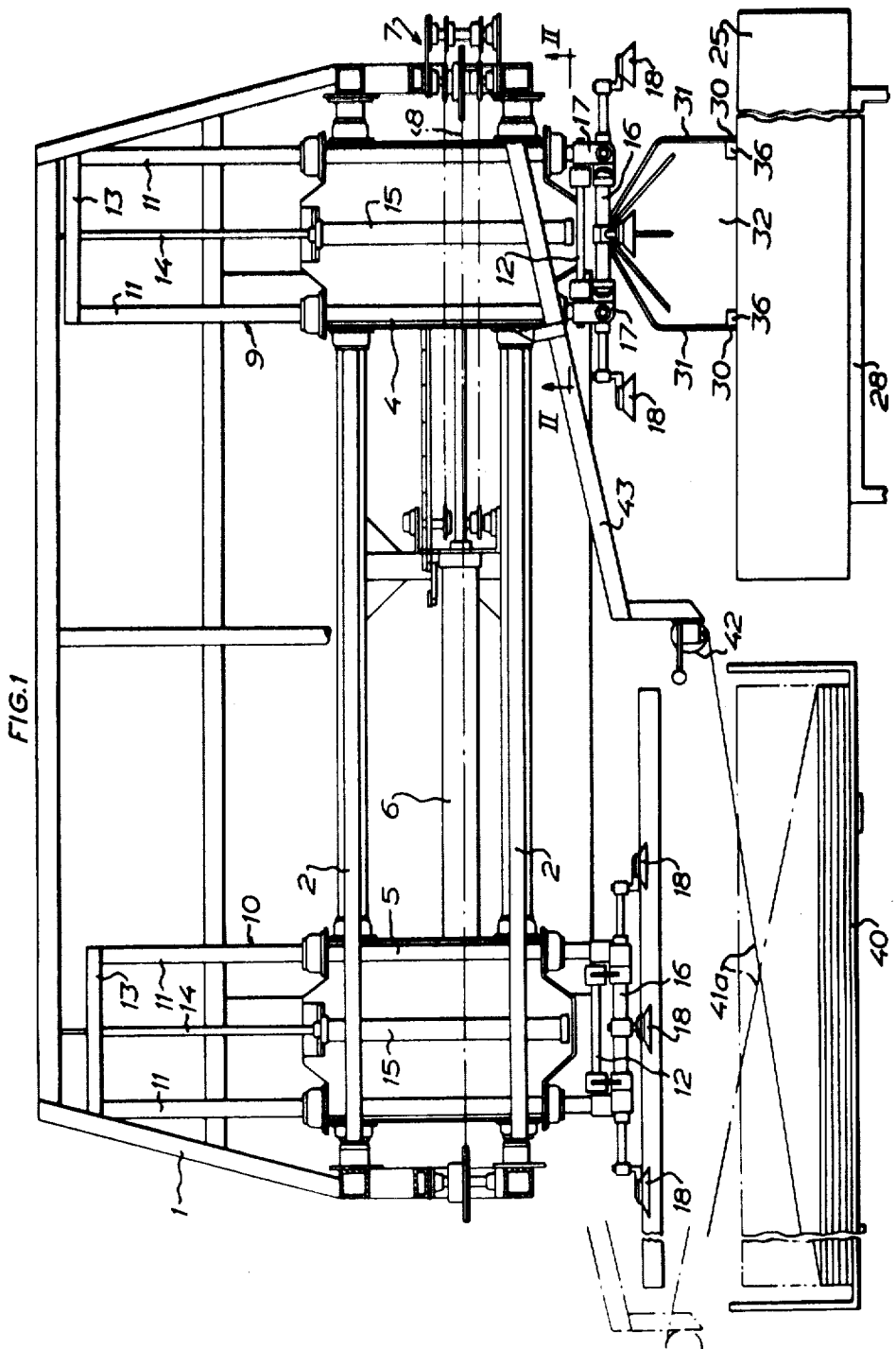
FIG. 1 is a plan view of the entire machine and certain accessories.
Figure 2:
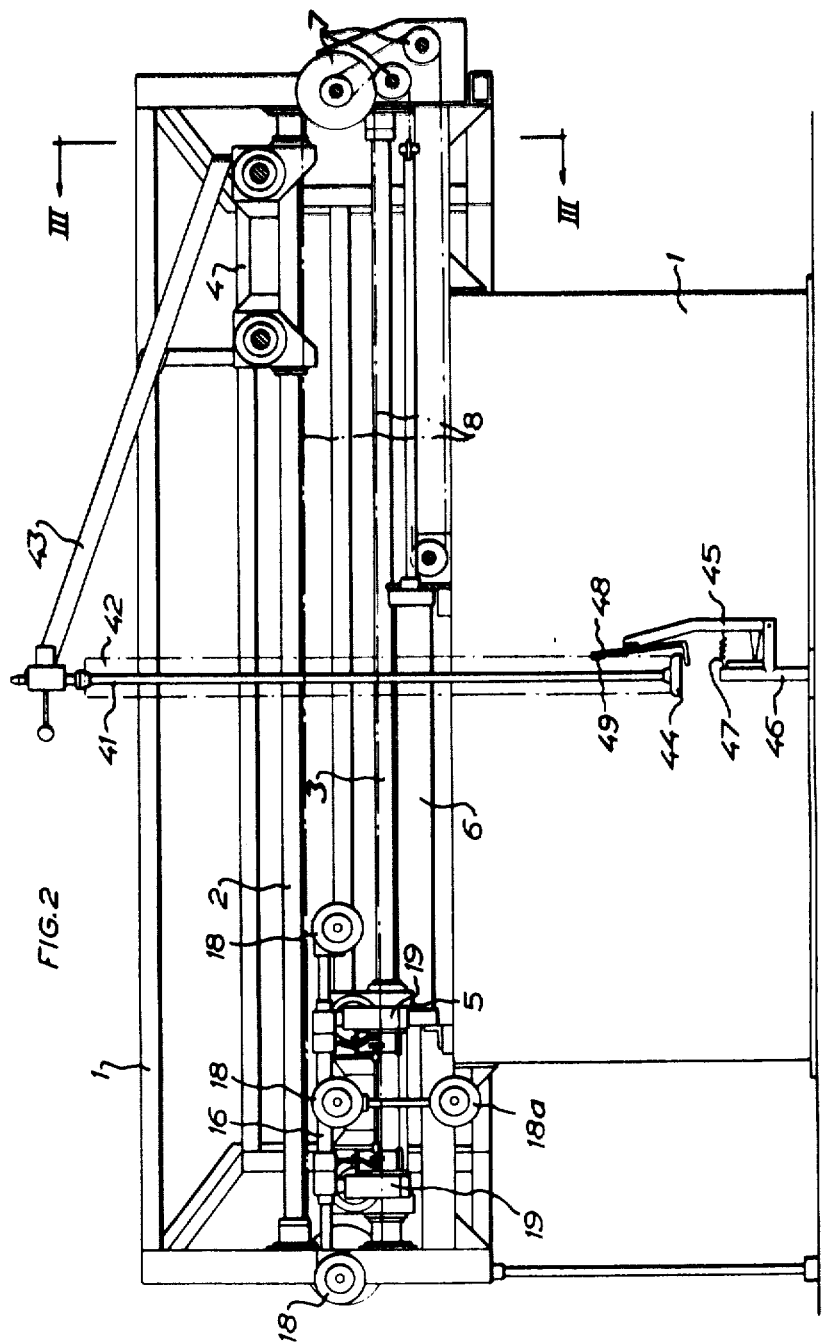
FIG. 2 is a front view of the machine, partly in section along line II—II of FIG. 1.

The machine comprises a frame 1, the major part of which is normally encased with sheet metal but which in its upper part is open in the front side of the machine illustrated in FIG. 2. The upper part of the frame, inside the front opening, carries two tracks, one upper track 2 and one lower track 3, each comprising two horizontal bars parallel to the front side of the frame. Two carriages 4, 5 are guided by means of bearings surrounding said bars, on each of said tracks and connected with a common drive for back and forth synchronous movement in opposite directions so that they will simultaneously be positioned each at one end of the machine, one carriage at a pick-up station shown to the right in FIGS. 1 and 2 and the other at a delivery station. The drive comprises a pneumatic piston and cylinder device 6 and a two-step chain transmission 7, the carriages being coupled each to one run of an endless chain 8.

Each carriage carries a slide 9, 10 in the form of a rectangular frame comprising a pair of parallel bars 11 perpendicular to the carriage track and fixedly interconnected by means of front and rear transverse beams 12 and 13, respectively. The bars 11 are movably guided in surrounding bearings on the carriage, and the rear transverse beam 13 is connected with a pneumatic piston and cylinder device or rather the piston rod 14 thereof, while the cylinder 15 of said device is mounted on the carriage.

On the front transverse beam 12 each slide carries a suction head consisting substantially of a shaft 16 rotatably mounted in a pair of blocks 17 located at the ends of the transverse beam 12, and at least three (four in the illustrated embodiment) suction cups 18, 18a mounted on pipes detachably mounted on the shaft 16 and connected to a suction line through hoses (not shown). As shown in the drawing, the three suction cups 18 of each suction head are located on a straight horizontal line, and the fourth suction cup 18a is located at a distance above this line on the upper suction head and at a distance below said line on the lower suction head. Furthermore, the bearings of the shaft 16 of either slide are so mounted on the blocks 17 that they can be raised and lowered by a pair of pneumatic piston and cylinder devices 19 mounted on said transverse beam 12 each adjacent one of the blocks 17. The piston rod of each device 19 is coupled to one arm of a bell crank lever 20 secured to the shaft 16, the other arm of said bell crank lever being provided with a laterally extending pin 21 which is guided in a slot 22 in a plate 23 secured on said block 17. The slot is curved so that the lifting movement towards its end is combined with a rotation of the shaft 16 and thus a tilting movement of the entire suction head, whereby the single suction cup 18a of the lower suction head will be retracted and that of the upper suction head will be advanced relative to the remaining cups. The lifting movement amounts to but a few centimeters, and the tilting movement to a few degrees.

Figure 4:
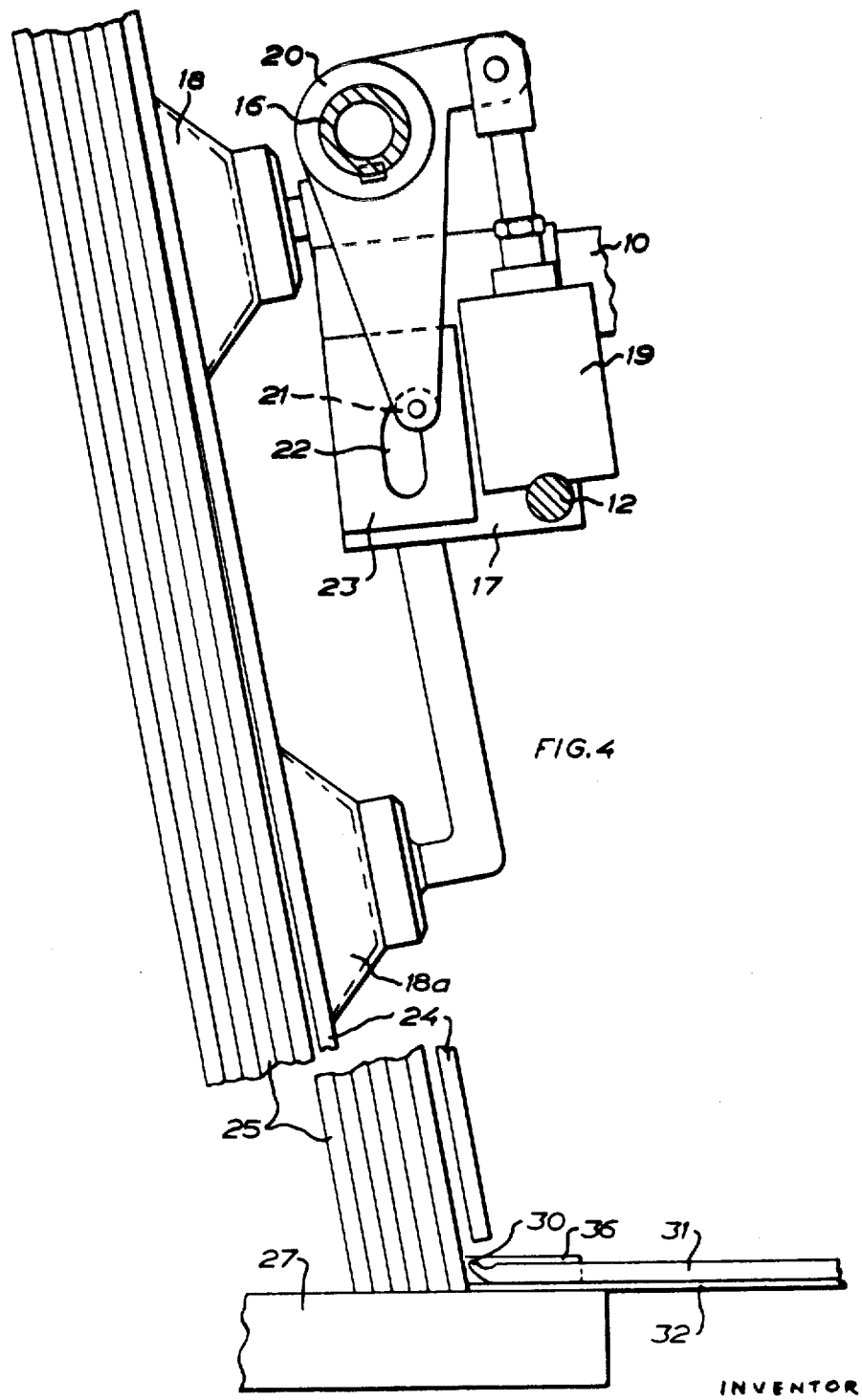
FIG. 4 shows, on a larger scale, part of FIG. 3 with one suction head in a different position than in FIG. 3.

These movements of the suction head are intended to free a glass sheet 24 (FIG. 4) adhering to the suction head from a glass pack 25 standing on edge on a pair of beams or arms 27 and inclined against a support 28 on a carriage 26 placed in front of the pick-up station and locked in position. To facilitate this release so that the machine, through movement of the slide 9 or 10, can quickly detach the glass sheet from the pack, the machine is provided at its lower front side with a pair of blowing nozzles 30 formed by the mouth of a pair of pipes 31 connected to the compressed air system of the machine and adapted, in connection with the above described tilting of the suction head, to produce an air stream of short duration, about 1 second, passing upwardly behind the adhering glass sheet 24, the lower edge of which has been raised above the nozzles and has lost its contact with the next glass sheet in the pack through the above described lifting and tilting movement of the suction head.

The compressed air pipes 31 are mounted on a holder in the form of a horizontal plate 32 which is carried by a slide bar 33 in a fixed guide 34 and is biased, through said slide bar, by a force directed against said glass pack and exerted by a pneumatic piston and cylinder device 35, the cylinder of which is secured to the guide 34. The plate 32 is provided at its front edge with a pair of abutments 36 limiting the advance of said plate by being brought into engagement with the glass pack at the lower edge thereof with the nozzles 30 adjacent said edge.

In the embodiment shown, the machine has for its object to pick up glass sheets one by one from the glass pack 25 at the pick-up station and to carry them to the delivery station at the other end of the machine where they are packed in a crate 40 (FIG. 1) placed on a carriage similar to the carriage 26 at the pick-up station.

Figure 3:
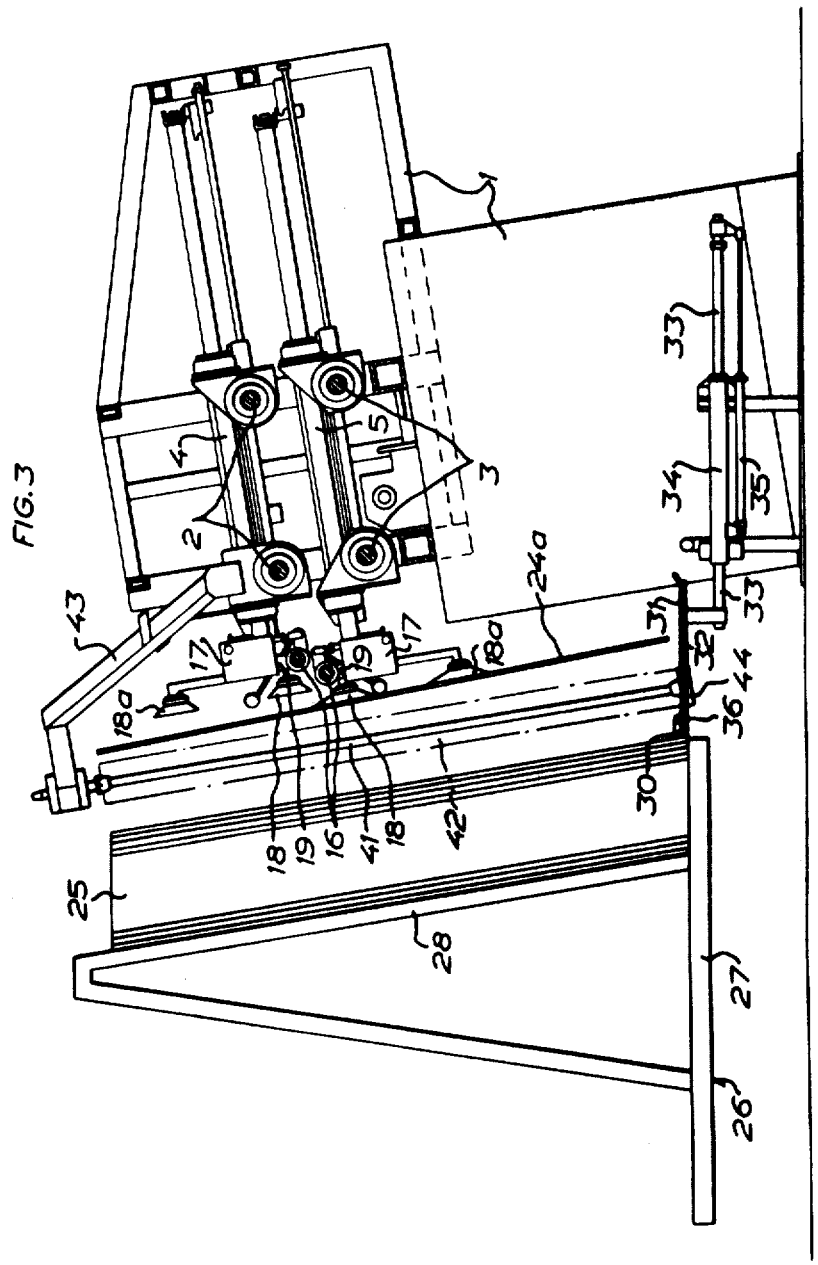
FIG. 3 is an end view partly in section along line III—III of FIG. 2.

With one or the other carriage 4, 5 at the pick-up station, its slide 9 is pushed forward by the pneumatic device 14, 15 so that the suction cups 18, 18a are engaged with the outermost glass sheet 24 of the pack 25, the suction cups being placed under vacuum so that they can now firmly hold the glass sheet. After the vacuum has been established, the suction head is caused by the devices 19 to carry out its lifting and tilting movement. Lifting of the adhering glass sheet 24 permits the blowing nozzle holder, i.e. the plate 32 to advance and urge its abutments 36 against the next glass sheet of the pack, with the blowing nozzles 30 adjacent thereto, and immediately following the tilting movement of the suction head, whereby the lower edge of the adhering glass sheet is swung outwards a few millimeters away from the next glass sheet, the blowing nozzles deliver a short compressed air blast upwardly behind the adhering glass sheet 24 which thus is completely detached from the glass pack and can be quickly withdrawn therefrom by the following rearward movement of the slide 9 or 10. This last mentioned movement is interrupted by separate stop means with the glass sheet in the position shown at 24a in FIG. 3, and the carriage, with the glass sheet on the suction head, then passes on to the delivery station where it again thrusts out the slide until the glass sheet is stopped in the crate 40, whereupon the vacuum of the suction cups is discontinued and, if desired, the suction cups are instead supplied with compressed air so that they will quickly release the glass sheet and can be retracted by withdrawing the slide, this time to a position, defined by an abutment, further back then at the pick-up station so that its suction head can pass the suction head of the other carriage with a glass sheet carried thereby, when they meet midway between the stations.

Naturally, various driving systems are possible, and in the embodiment here described, the machine is operated entirely pneumatically, the entire sequence of movements being controlled by stop means, valves, throttle means and other conventional pneumatic system components, using a supply of compressed air for power, and the valves are controlled by abutments or feelers in known manner so that each movement, when terminated, initiates the next movement, and the machine thus operates automatically after it has been started by operating a main valve in the compressed air system and a further main valve in a vacuum system to which the suction cups are connected. These systems, which are not shown in the drawings, do not per se constitute an invention and are not considered to require a complete description since their construction is more or less a matter of routine to a pneumatics expert on the basis of the specified movement pattern.

When glass sheets are to be packed for transport or storage, it is necessary to provide them with interleaving means since a direct contact between the glass sheets may cause damage to their surfaces unless they are completely dry, and this is seldom the case. Paper is the conventional interleaving means and the above described machine is equipped with a device placing paper over each glass sheet which is put into the crate 40.

This device consists substantially of a shaft 41 for a paper roll 42, said shaft being removably suspended on an arm 43 secured to the upper carriage 4 of the machine, and having the same inclination as the glass sheets in the crate 40 as well as such a position that it passes the crate 40 every time the carriage 4 is moved from one station to the other. The paper roll is pushed onto the shaft and then carried by a head 44 at the lower end thereof. When packaging is begun, the paper withdrawn from the roll is held by hand to the crate 40, and then a length of paper 41a (FIG. 1) is rolled out over the crate opening each time a glass sheet is carried to the crate by one or the other carriage 4, 5.

Because of the high operational speed of the machine, the roll will rotate very quickly during each operation. It must therefore be braked, and FIG. 2 shows a device for this purpose. The device comprises an abutment arm 45 swingably mounted on a fixed post 46 and spring loaded (at 47) to be held against the paper roll. Furthermore, a brake arm 48 having a brake shoe 49 is swingably mounted on the head 44 and, when engaging the arm 45, moves the brake shoe into contact with the paper roll and brakes it so that not too much paper is rolled out prematurely.

As has already been indicated, the scope of this invention is not restricted to the embodiment illustrated and described above, which can be modified in many different ways. For example, the machine can be built for handling the glass sheets in horizontal position, and the operating mechanisms can be replaced by others. However, a pneumatic operation would seem preferable, on one hand because it offers excellent possibilities of smoothly accelerating and decelerating movements which are not positive but can be stopped by abutments without any risk of overloading and, on the other hand, because the machine, irrespective of its driving system, must have a pneumatic equipment for the suction cups and the blowing nozzles.

What I claim and desire to secure by Letters Patent is:

1. A machine for packing glass sheets interleaved with paper, characterized by two carriages (4, 5) movable back and forth in parallel paths and simultaneously each in one direction, suction heads (16, 18, 18a) movably mounted on said carriages for alternatively picking up the glass sheets one at a time at a pick-up station (28) and delivering them to receiving means (40) at a delivery station, and a holder (41) for a paper roll secured to one of said carriages (4) and positioned to be carried, by each movement of that carriage from station to station, past the delivery station between said receiving means and the paths of station-to-station movement of said suction heads for spreading paper over the glass sheet last delivered.

2. A machine as claimed in claim 1, in which the holder is a shaft with end supports for the paper roll.

3. A machine as claimed in claim 1 or 2, in which the holder is provided with means for braking the rotational movement of the paper roll, said means being operable by a stationary abutment.

* * * * *